(12) United States Patent
Firstenberg et al.

(10) Patent No.: US 9,226,108 B2
(45) Date of Patent: Dec. 29, 2015

(54) PUBLISHING LOCATION INFORMATION

(75) Inventors: Yosef Firstenberg, Redmond, WA (US); Li Hua, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 13/076,438

(22) Filed: Mar. 31, 2011

(65) Prior Publication Data

US 2012/0252504 A1    Oct. 4, 2012

(51) Int. Cl.
| | |
|---|---|
| *H04W 4/00* | (2009.01) |
| *H04W 24/00* | (2009.01) |
| *H04W 4/02* | (2009.01) |
| *H04W 4/20* | (2009.01) |

(52) U.S. Cl.
CPC .............. *H04W 4/021* (2013.01); *H04W 4/003* (2013.01); *H04W 4/206* (2013.01)

(58) Field of Classification Search
CPC .. H04W 64/00; H04W 4/02; H04L 29/08657; H04L 41/12; H04L 45/02; H04L 45/00; G06Q 30/02; G06Q 10/10; G06Q 10/06
USPC ............ 455/456.2, 435.1, 457, 466; 370/254; 705/1.1, 319; 340/539.13; 707/912
See application file for complete search history.

(56) References Cited

U.S. PATENT DOCUMENTS

| | | | |
|---|---|---|---|
| 6,594,666 B1 | 7/2003 | Biswas et al. | |
| 7,330,112 B1 * | 2/2008 | Emigh et al. | 340/539.13 |
| 7,519,669 B2 * | 4/2009 | Nikolov | 709/206 |
| 7,590,720 B2 | 9/2009 | Bahl | |
| 7,640,357 B2 * | 12/2009 | Kirov et al. | 709/233 |
| 7,747,963 B2 | 6/2010 | Othmer et al. | |
| 7,907,144 B2 * | 3/2011 | Danan | 345/530 |
| 8,095,598 B2 * | 1/2012 | Follmeg et al. | 709/206 |
| 8,161,527 B2 * | 4/2012 | Curren | 726/2 |
| 2006/0195361 A1 | 8/2006 | Rosenberg | |
| 2007/0117576 A1 | 5/2007 | Huston | |
| 2007/0156808 A1 * | 7/2007 | Koegel et al. | 709/203 |
| 2007/0157213 A1 * | 7/2007 | Koegel | 719/315 |
| 2007/0242077 A1 * | 10/2007 | Danan | 345/536 |
| 2007/0281689 A1 * | 12/2007 | Altman et al. | 455/435.1 |
| 2007/0281690 A1 * | 12/2007 | Altman et al. | 455/435.1 |
| 2007/0281716 A1 * | 12/2007 | Altman et al. | 455/466 |
| 2007/0282621 A1 * | 12/2007 | Altman et al. | 705/1 |

(Continued)

FOREIGN PATENT DOCUMENTS

| | | |
|---|---|---|
| JP | 2010028322 A | 2/2010 |
| WO | 2009/036497 A1 | 3/2009 |

OTHER PUBLICATIONS

"International Search Report", Mailed Date: Oct. 4, 2012, Application No. PCT/US2012/028842, Filed Date: Mar. 13, 2012, pp. 9.

(Continued)

*Primary Examiner* — William D Cumming
(74) *Attorney, Agent, or Firm* — Doug Barker; Nicholas Chen; Micky Minhas

(57) ABSTRACT

The claimed subject matter provides a method for publishing location information. The method includes receiving the location information from an entity. The entity may be associated with a geographic location. The method further includes identifying one or more entities to be notified of the location information. Additionally, the method includes sending the location information to the identified entities.

16 Claims, 7 Drawing Sheets

(56) References Cited

U.S. PATENT DOCUMENTS

| | | |
|---|---|---|
| 2008/0032666 A1 | 2/2008 | Hughes et al. |
| 2008/0132252 A1* | 6/2008 | Altman et al. ............... 455/457 |
| 2008/0186164 A1* | 8/2008 | Emigh et al. ............ 340/539.13 |
| 2008/0198399 A1* | 8/2008 | Jacques ...................... 358/1.15 |
| 2009/0100037 A1* | 4/2009 | Scheibe ........................... 707/5 |
| 2009/0254840 A1* | 10/2009 | Churchill et al. ............. 715/753 |
| 2009/0319616 A1* | 12/2009 | Lewis et al. ................... 709/206 |
| 2010/0062794 A1* | 3/2010 | Han ............................. 455/457 |
| 2010/0161600 A1* | 6/2010 | Higgins et al. ............... 707/736 |
| 2010/0189251 A1* | 7/2010 | Curren ........................... 380/28 |
| 2010/0246467 A1 | 9/2010 | Song et al. |
| 2010/0312809 A1* | 12/2010 | Calder et al. .................. 707/912 |
| 2010/0325194 A1 | 12/2010 | Williamson et al. |
| 2011/0009131 A1 | 1/2011 | Pan |
| 2011/0023036 A1* | 1/2011 | Humphreys et al. .......... 718/100 |
| 2011/0151891 A1* | 6/2011 | Edwards et al. ........... 455/456.2 |
| 2012/0008526 A1* | 1/2012 | Borghei ....................... 370/254 |
| 2012/0078643 A1* | 3/2012 | Nagpal et al. ................... 705/1.1 |
| 2012/0252504 A1* | 10/2012 | Firstenberg et al. .......... 455/457 |
| 2013/0073387 A1* | 3/2013 | Heath ........................ 705/14.53 |
| 2013/0073389 A1* | 3/2013 | Heath ........................ 705/14.54 |
| 2013/0073400 A1* | 3/2013 | Heath ........................ 705/14.73 |
| 2013/0073473 A1* | 3/2013 | Heath ............................ 705/319 |

OTHER PUBLICATIONS

Li, et al., "Geographic Community Analysis of Mobile Social Network", Retrieved at<<http://www.cs.uml.edu/~glchen/papers/msncommunity-snas09.pdf>>, Dec. 14, 2010, pp. 4.

"Extended European Search Report Issued in European Patent Application No. 12762859.2", Mailed Date: Jul. 23, 2014, 8 Pages.

Astrain, et al., "Fuzzy Location and Tracking on Wireless Networks", In Proceedings of the 4th International Workshop on Mobility Management and Wireless Access, Oct. 2, 2006, pp. 84-91.

Li, et al., "Sharing Location in Online Social Networks", In IEEE Network, vol. 24, Issue 5, Sep. 1, 2010, pp. 20-25.

"Office Action Issued in European Patent Application No. 12762859.2", Mailed Date: Mar. 25, 2015, 6 Pages.

* cited by examiner

200

300

400

600

PUBLISHING LOCATION INFORMATION

BACKGROUND

In the world of social networking, some users may be interested in publishing geographically-based information, i.e., location information, about themselves. Location information may be information in the context of a given location, which could be about the location itself, but not necessarily. Such information may vary, including dynamic information. For example, as a person walks through a neighborhood, that person may want to let friends know their current location. A person sitting in a café, may want to know who else in the area may share the same interests. A business may want to know the statistics about people going to a certain location during a certain time. However, making this type of information available to any user raises issues of privacy and scalability. Privacy issues may arise for users that want to limit who can view their geographic information. Scalability issues arise from attempting to make available, to an individual user, a potentially overwhelming volume of information.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter provides a system and method for publishing, and collecting, location information. Entities, such as users, may publish location information to a cloud service that broadcasts the location information to associates of the user, or strangers to the user. Associates may include friends or buddies. The location information may include physical coordinates of the user, along with other information specified by the user. For associates with whom the user has a relationship, the location information may include private information about the user. The cloud service may also broadcast the location information to other users with an interest in a region where the user is located. These users may receive such location information by subscribing to regions of interest. Privacy protections may enable the user to restrict what information is viewable to which users.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
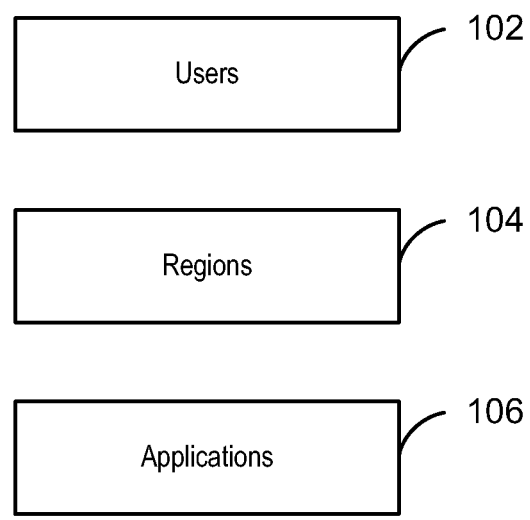
FIG. 1 is a block diagram of a system of entities in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

In one embodiment using social networking environments, people may view information about other people in their own geographical regions, or in regions to which the user subscribes. Additionally, people may publish information about themselves to others, who may be in the region, or interested in the region. For example, people may publish their current location in the region. Such an embodiment may implicate issues of privacy. Specifically, people may prefer to limit what information about themselves others are allowed to view.

For example, even in the social networking environment, most people are strangers to each other. As such, there may not be explicit relationships between people who want to share information about a geographical region.

It is noted that social networking environments are not limited to people. Many applications, e.g., software applications, may be incorporated into these environments. As such, these applications may also use geographical information. For convenience, the terms entity is used herein to describe people, applications, and others in the social networking environment.

In one embodiment, relationships may be established between entities sharing a geographical region. This may enable the entities to share information about the geographical region. These relationships may be established using a proxy entity—the geographical region itself. The region may provide ways to discover entities, define permissions, and enable communications.

Establishing such relationships may implicate further issues of discoverability, communication, and scalability. Discoverability may be the ability to determine all the people currently located within a specific geographical region. Communication challenges may arise in connecting people who are strangers to each other. Further, there may be inherent scalability issues in creating relationships between groups of people that may number in the millions or higher.

In such an embodiment, the implicit relationships between entities in a given region may be used to establish explicit relationships. Additionally, the region entity may be used to provide a context to these relationships. Further, using the geographic entity may provide a way to handle the inherent scalability challenges.

FIG. 1 is a block diagram of a system 100 of entities in accordance with the claimed subject matter. The system 100 may include users 102, regions 104, and applications 106. Each user 102 may have explicit relationships with other users, e.g, associates, such as friends or buddies. An associate may be another user 102, that a first user specifically allows to see the first user's location. Users 102 may define their associates using typical tools, such as, buddy lists and the like. The users 102 who are not associates may be considered strangers. In one embodiment, the system 100 may enable clients to publish their geographic location, see the locations of their associates, and receive location notifications of strangers in specified geographic regions 104. For privacy, users 102 may restrict what, when, and for whom, published information is viewable. The geographic location may be, for example, specific latitude and longitude coordinates.

The regions 104 may be any geographical area of the earth's surface. The regions 104 may be defined according to: a gridding method, boundaries, or some other specification. Gridding methods may define regions 104 in rectangular shapes. In one embodiment, the entire surface of the earth may be gridded into rectangular regions 104. In such an embodiment, each region 104 may be defined by a pair of latitude and longitude coordinates. The first coordinate may represent a southwest corner, and the second coordinate may represent a northeast corner of the region 104. Alternatively, the regions 104 may be defined according to boundaries, such as zip codes, geopolitical borders, etc. The areas included in regions 104 may be generated and updated dynamically, based on specified rules, system conditions, or other preferences.

In some cases, it is useful to determine the region based on a user's current location. In such cases, the time needed to lookup which geographic region a location belongs to may be minimized by dividing the world uniformly and storing the regions 104 in a 2D array. In another embodiment, the regions 104 may be configured based on population data and stored in a tree structure, e.g, a quad tree or kd tree.

The applications 106 may be software applications that use regional information. For example, the application 106 may recommend restaurants based on the user's current location and published reviews of restaurants in that region.

The entities may subscribe to one or more regions 104. Subscribing to a region means the user is interested in receiving location and location-related information from all entities publishing locations in the subscribed-to region. Entities may also subscribe to an associates's location information.

The region 104 that a user 102 subscribes to is referred to herein as a subscription region. The subscription region may be defined by any pair of latitude and longitude coordinates.

Accordingly, when the users 102, applications 106 publish information about specific regions 104, this information may be provided to the entities that subscribe to these regions. The information may be provided via a one-time update, or continuously, via a data stream.

The information provided is referred to herein as a location notification. The location notification may, in some cases, merely inform a first user that a second user is in a region 104 subscribed to by the second user. In other cases, the location notification may also include personal information, communications (e.g., texts), etc.

In one embodiment, the regions 104 may be sized and located so an average subscription region covers most of the geographic region. A subscription region may be a region to which the user subscribes. A geographic region may be a region divided up for subscriptions. The difference between the subscription region and the geographic region may be that users may be interested in subscribing to regions different from predefined geographic regions. In such a case, the user may receive all notifications within this region. The user's client may then filter the notifications to limit the notifications only to the smaller subscribed to region.

For example, the user may select a subscription region by drawing a rectangle on a portion of a map. As such, the subscription region may include merely a portion of a geographic region represented as the region entity. In such a scenario, the user may receive notifications regarding the entire geographic region, but implement a filter on a client that limits the notifications viewed to the subscription region. This may be useful in population-dense areas, e.g., cities. If a user 102 subscribes to a small portion of a region, most of the notifications from that geographic region will be of no interest to the user. In population-sparse areas like oceans, there are likely to be few publications. As such, it may be more efficient to send a subscriber notification of all the events in a large part of the ocean, even if most of them will be ignored.

The regions 104 may be sized and located so an average subscription region intersects as few geographic regions as possible. A new subscription may be made for every geographic region that a subscription region intersects, increasing the total load.

By subscribing to a region 104, these entities may create relationships with the other entities associated with the region, e.g., a user 102 currently located in the region. The system 100 may define a set of available relationship types, and provide ways for the entities to manage relationships with other entities. The relationships types may define the types of information that the subscribing entity may receive. For example, one relationship type may enable the user to receive notifications about all other entities in this region based on specific metadata. The user may specify that they receive notifications regarding other users interested in hiking in Bellevue, Wash. Alternately, when sitting in a restaurant, the user may specify that they receive notifications about other users in the restaurant that like wine.

Figure 2:
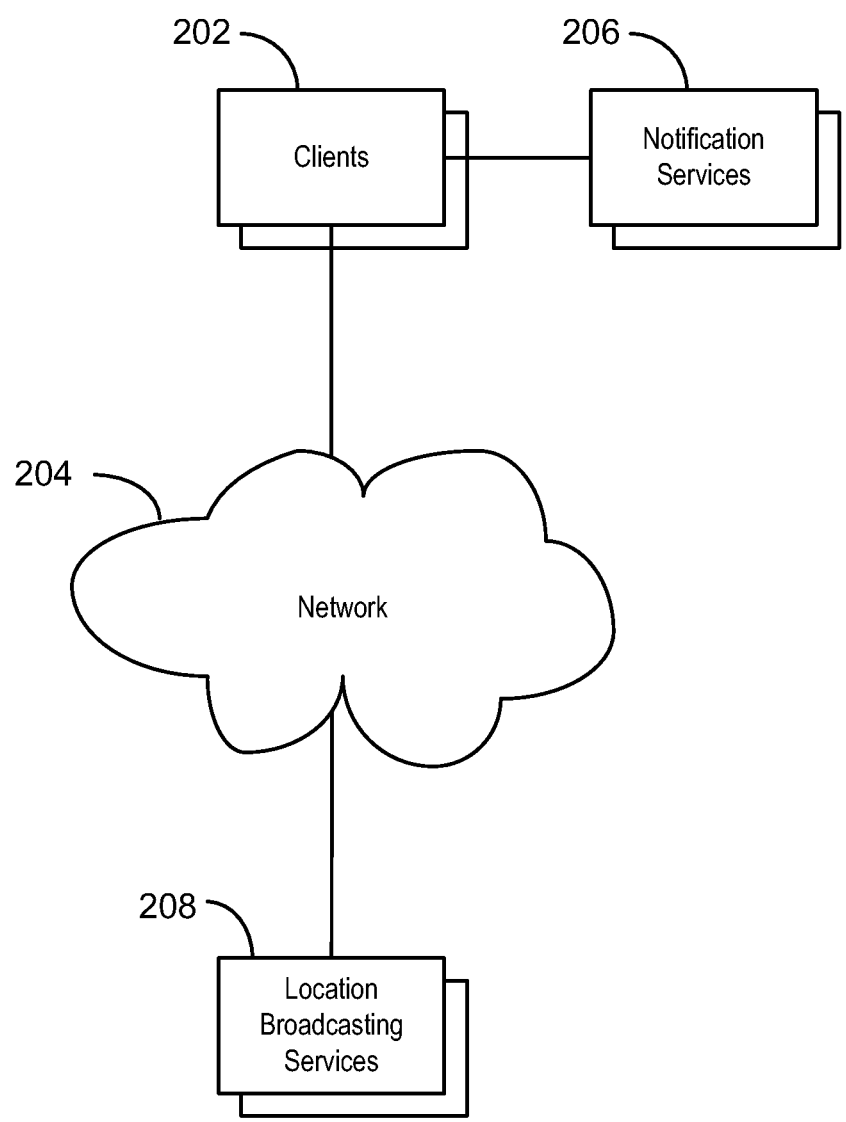
FIG. 2 is a block diagram of a system in accordance with the claimed subject matter.

FIG. 2 is a block diagram of a system 200 in accordance with the claimed subject matter. In one embodiment, the system 200 may track and display a map that includes points of interest that represent the users 102 in specified regions 104. The points of interest may appear as set of dynamic points that appear, disappear, and change position. In some cases, notifications may be received when users 102 leave the map. Search capabilities and metadata may be provided to enable users 102 to search and filter locations. In this way, the user 102 may merely find other users 102 of interest. The system 200 may also include an application program interface (API) to enable interfaces with existing services that make use of location (e.g. Yelp, Craigslist, Match.com, Outlook). Additionally, the system 200 may provide a location history. The location history may enable associates to see where a user 102 has been, or plans to be.

The system 200 includes clients 202, a network 204, a notification service 206, and a location broadcasting service 208. The clients 202 may be devices or client applications that send and receive regional information over the network 204. The clients 202 may include communications and computing devices, such as, mobile telephones, personal digital assistants, and desktop computers. The clients 202 may also include applications running on such devices. The network 204 may be any communications network or collection of networks, such as, the Internet.

The clients 202 may include a set of APIs that interact with the notification service 206. The notification service 206 may be a cloud service provided by a platform that the client 202 runs on. The notification service 206 may be configured to facilitate communications between the clients 202 and the network 204.

The location broadcasting service 208 may be another cloud service through which the clients 202 may send and receive regional information. The location broadcasting service 208 may provide regional information to subscribers of specific regions, and maintain the subscriptions between the users 102 and the regions 104.

As stated previously, such a system may produce a great deal of information for a single entity to process. Accordingly, relationships may be defined in ways that enable entities to limit the amount of information viewable. For example, the user 102 may prefer, instead of receiving information about all businesses in the region, merely information about the restaurants. The information available to any entity may be made available as a one-time update, e.g., request-response, or ongoing updates, e.g., an activity stream. For purposes of privacy, all or specific entities may be prevented from viewing one's information. For example, all entities may be prevented from seeing a private user's location while the private user is within a specified distance of their home.

The system may include functionality enabling the user 102 to publish their location, update privacy settings, subscribe/unsubscribe to regions 104 (or associates), retrieve location notifications from associates, and retrieve location notifications from strangers in the user's subscription regions. The user 102 may also remove herself from the location broadcasting service 108. As such, the location broadcasting service 108 stops sending location information about the removed user. Associates and strangers may receive notifications that location information is no longer available for the removed user. Strangers may also receive notifications regarding the removed user.

Figure 3:
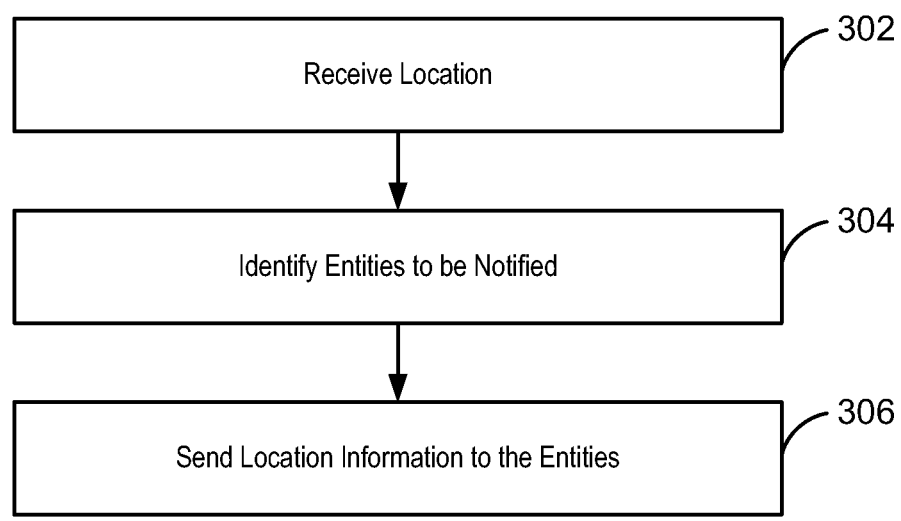
FIG. 3 is a process flow diagram of a method for processing location information in accordance with the claimed subject matter.

FIG. 3 is a process flow diagram of a method 300 for publishing location information in accordance with the claimed subject matter. In one embodiment, the location broadcasting service 108 may perform the method 300.

The method 300 begins at block 302, where the location broadcasting service 108 may receive location information. The location information may be sent by a user 102, application 106, or other entity. The location information may include latitude, longitude coordinates. Additionally, the location information may include personal information the user 102 allows strangers to view. The location information may also include event or other information related to the user 102 sending the information. Events may be related to personal information, or merely represent a notification. For example, an event related to personal information may be a birthday party, anniversary, etc. Notification events may include notifications that another user is entering or leaving a region.

At block 304, the location broadcasting service 108 may identify the entities to be notified of the location information. The entities to be notified may include all associates. The entities may also include users 102, applications 106, etc., that are subscribing to the sending user's current region. As such, the location broadcasting service 108 may, based on the location, determine the region 104 where the user 102 sending the information is located. In one embodiment, a persistent hash map may be used to determine the region. Once the region 104 is determined, the location broadcasting service 108 may determine, using local or remote datastores, all the entities subscribing to the publishing user's current region.

Notifications to strangers or associates may be restricted based on relationship types, privacy settings, etc. Accordingly, the location broadcasting service 108 may merely identify the strangers and associates that meet these restrictions. For example, strangers may be restricted to viewing location information about users 102 that are within the region 104 the strangers subscribe to. Strangers may be further restricted from viewing personal information (email address, user names, etc.) about the publishing user. In some cases, location notifications may only be sent to associates if the publishing user gives permission to the associate, and the associate specifically requests a location notification for the user 102. Similar restrictions may exist with regard to any of other entities. At block 306, the location broadcasting service 108 may send the location information to the identified entities.

Figure 4:
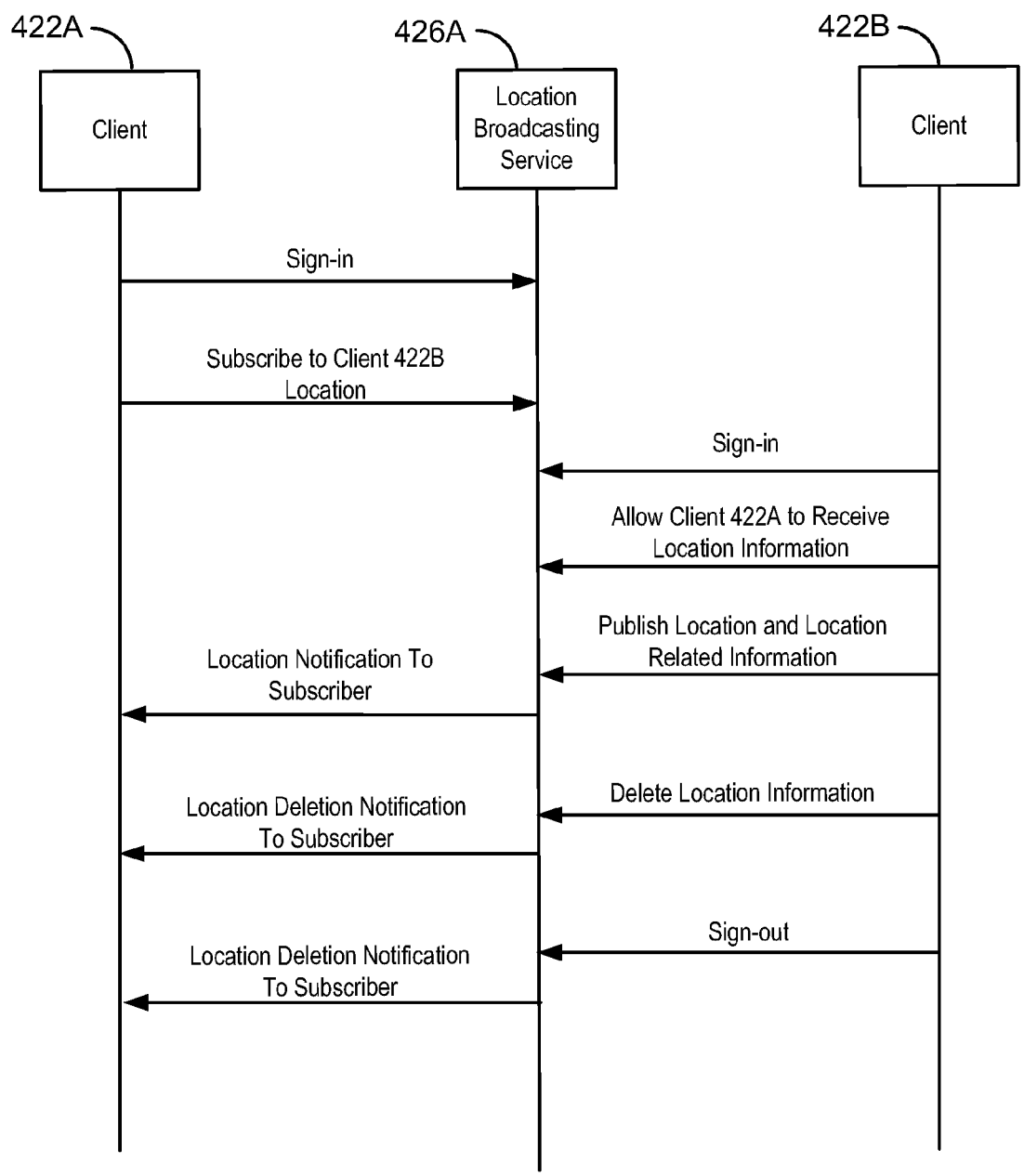
FIG. 4 is a message flow diagram for a client to publish location information to associates of a user in accordance with the claimed subject matter.
Figure 5:
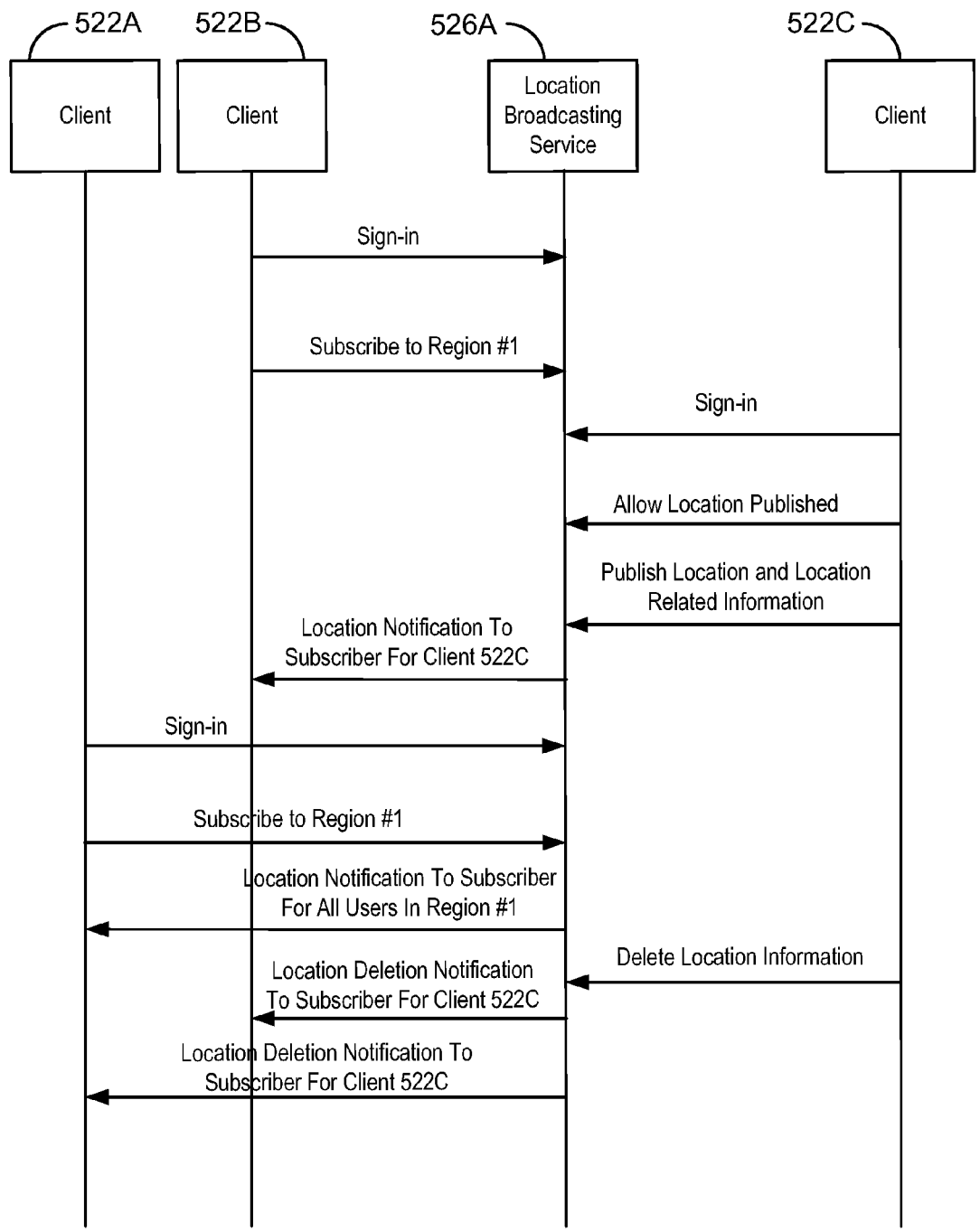
FIG. 5 is a message flow diagram for a client to publish location information to strangers in accordance with the claimed subject matter.

FIGS. 4-5 are message flow diagrams for example location information scenarios in accordance with the claimed subject matter. The scenarios include publishing location information to associates, and publishing location to strangers.

FIG. 4 is a message flow diagram 400 for a client 422B to publish location information to associates in accordance with the claimed subject matter. In this scenario, client 422A is an associate of client 422B. Client 422A signs in and subscribes to the location of client 422B. Client 422B also signs in and allows client 422A to receive location information for client 422B. Client 422B publishes location and related information, such as a nickname and age. Client 422A is notified of the information that client 422B published. Client 422B then removes himself from the location broadcasting service 426A, and client 422A is notified that client 422B is no longer publishing.

FIG. 5 is a message flow diagram 500 for a client 522C to publish location information to strangers in accordance with the claimed subject matter. Client 522B signs in and subscribes to a region ("Region #1"). The client 522C signs in and allows location information to be published to strangers. The client 522C then publishes location and related information from Region #1. The 522A then signs in and subscribes to Region #1. The client 522A then receives a location notification for all users in Region #1, including client 522C. The client 522C removes himself from location broadcasting service 526A, and clients 522A and 522B are notified that client 522C is no longer publishing. Alternatively, the client 522C may remove himself from the location broadcasting service 526A by signing out.

Figure 6:
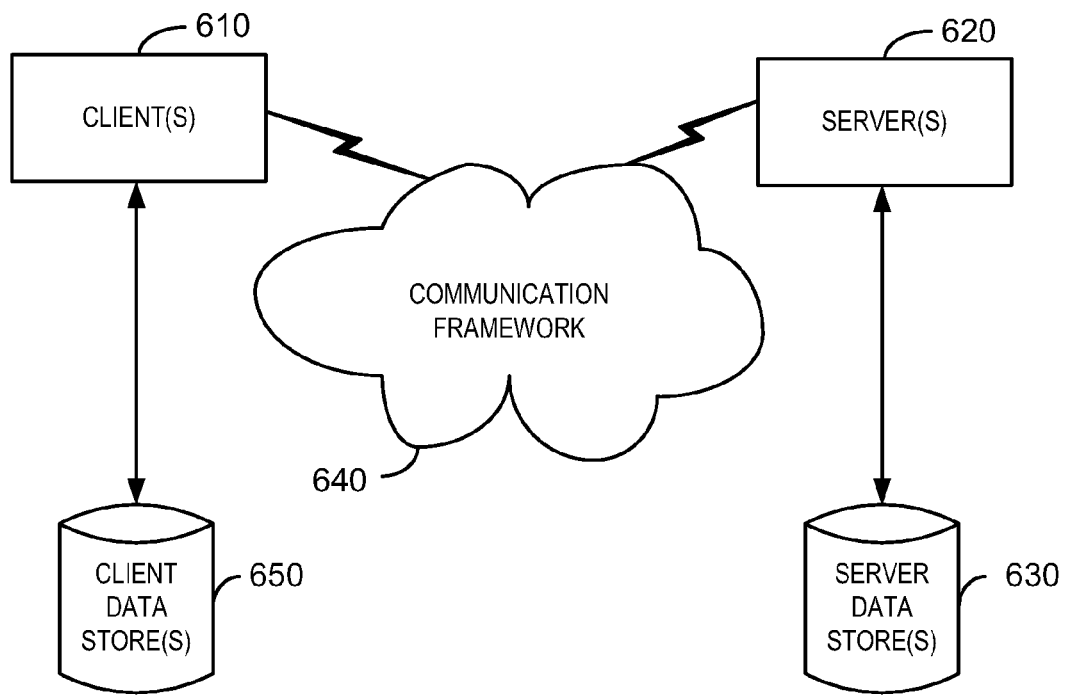
FIG. 6 is a block diagram of an exemplary networking environment wherein aspects of the claimed subject matter can be employed.

FIG. 6 is a block diagram of an exemplary networking environment 600 wherein aspects of the claimed subject matter can be employed. Moreover, the exemplary networking environment 600 may be used to implement a system and method of communicating with non-connected clients.

The networking environment 600 includes one or more client(s) 610. The client(s) 610 can be hardware and/or software (e.g., threads, processes, computing devices). As an example, the client(s) 610 may be computers providing access to servers over a communication framework 640, such as the Internet.

The environment 600 also includes one or more server(s) 620. The server(s) 620 can be hardware and/or software (e.g., threads, processes, computing devices). The server(s) 620 may include network storage systems. The server(s) may be accessed by the client(s) 610.

One possible communication between a client 610 and a server 620 can be in the form of a data packet adapted to be transmitted between two or more computer processes. The environment 600 includes a communication framework 640 that can be employed to facilitate communications between the client(s) 610 and the server(s) 620.

The client(s) 610 are operably connected to one or more client data store(s) 650 that can be employed to store information local to the client(s) 610. The client data store(s) 650 may be located in the client(s) 610, or remotely, such as in a cloud server. Similarly, the server(s) 620 are operably connected to one or more server data store(s) 630 that can be employed to store information local to the servers 620.

Figure 7:
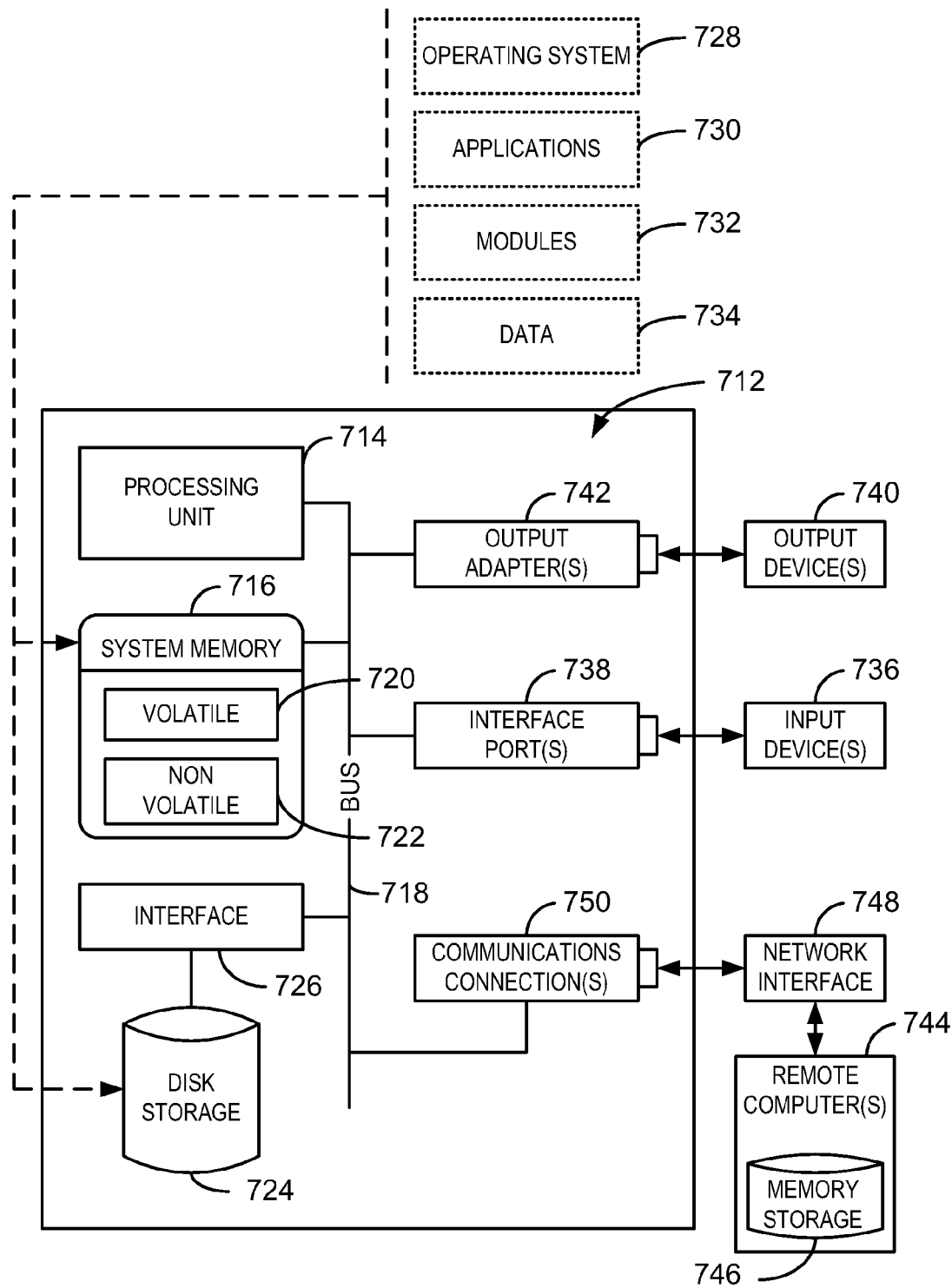
FIG. 7 is a block diagram of an exemplary operating environment for implementing various aspects of the claimed subject matter.

With reference to FIG. 7, an exemplary operating environment 700 is shown for implementing various aspects of the claimed subject matter. The exemplary operating environment 700 includes a computer 712. The computer 712 includes a processing unit 714, a system memory 716, and a system bus 718.

The system bus 718 couples system components including, but not limited to, the system memory 716 to the processing unit 714. The processing unit 714 can be any of various available processors. Dual microprocessors and other multi-processor architectures also can be employed as the processing unit 714.

The system bus 718 can be any of several types of bus structure(s) including the memory bus or memory controller, a peripheral bus or external bus, and/or a local bus using any variety of available bus architectures known to those of ordinary skill in the art. The system memory 716 comprises non-transitory computer-readable storage media that includes volatile memory 720 and nonvolatile memory 722.

The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable programmable ROM (EEPROM), or flash memory.

Volatile memory 720 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 712 also includes other non-transitory computer-readable media, such as removable/non-removable, volatile/non-volatile computer storage media. FIG. 7 shows, for example a disk storage 724. Disk storage 724 includes, but is not limited to, devices like a magnetic disk drive, floppy disk drive, tape drive, Jaz drive, Zip drive, LS-100 drive, flash memory card, or memory stick.

In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in the suitable operating environment 700. Such software includes an operating system 728. Operating system 728, which can be stored on disk storage 724, acts to control and allocate resources of the computer system 712.

System applications 730 take advantage of the management of resources by operating system 728 through program modules 732 and program data 734 stored either in system memory 716 or on disk storage 724. It is to be appreciated that the claimed subject matter can be implemented with various operating systems or combinations of operating systems.

A user enters commands or information into the computer 712 through input device(s) 736. Input devices 736 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 736 connect to the processing unit 714 through the system bus 718 via interface port(s) 738. Interface port(s) 738 include, for example, a serial port, a parallel port, a game port, and a universal serial bus (USB).

Output device(s) 740 use some of the same type of ports as input device(s) 736. Thus, for example, a USB port may be used to provide input to the computer 712, and to output information from computer 712 to an output device 740.

Output adapter 742 is provided to illustrate that there are some output devices 740 like monitors, speakers, and printers, among other output devices 740, which are accessible via adapters. The output adapters 742 include, by way of illustration and not limitation, video and sound cards that provide a means of connection between the output device 740 and the system bus 718. It can be noted that other devices and/or systems of devices provide both input and output capabilities such as remote computer(s) 744.

The computer 712 can be a server hosting various software applications in a networked environment using logical connections to one or more remote computers, such as remote computer(s) 744. The remote computer(s) 744 may be client systems configured with web browsers, PC applications, mobile phone applications, and the like.

The remote computer(s) 744 can be a personal computer, a server, a router, a network PC, a workstation, a microprocessor based appliance, a mobile phone, a peer device or other common network node and the like, and typically includes many or all of the elements described relative to the computer 712.

For purposes of brevity, only a memory storage device 746 is illustrated with remote computer(s) 744. Remote computer(s) 744 is logically connected to the computer 712 through a network interface 748 and then physically connected via a communication connection 750.

Network interface 748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to the computer 712. The hardware/software for connection to the network interface 748 may include, for exemplary purposes only, internal and external technologies such as, mobile phone switches, modems including regular telephone grade modems, cable modems and DSL modems, ISDN adapters, and Ethernet cards.

An exemplary processing unit 714 for the server may be a computing cluster comprising Intel® Xeon CPUs. The disk storage 724 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for publishing location information, comprising:
   receiving the location information in a location broadcasting service from an entity associated with a geographic location;
   identifying, with the location broadcasting service, one or more entities to be notified of the location information based in part on metadata provided by the one or more entities, the one or more entities comprising associates and strangers of the entity associated with the geographic location, and the one or more identified entities to be prevented from being notified of the location information when the location information is within a specified distance of a home of the entity associated with the geographic location;
   and sending the location information to the identified entities from the location broadcasting service.

2. The method recited in claim 1, wherein identifying the one or more entities comprises identifying one or more associates that are allowed to view private information about the entity, and wherein the location information comprises the private information.

3. The method recited in claim 1, wherein identifying the one or more entities comprises:
   determining a geographic region comprising the geographic location; and
   identifying one or more strangers to the entity, wherein the strangers are restricted from viewing private information about the entity; and wherein the strangers subscribe to the geographic region.

4. The method recited in claim 3, wherein the location information comprises information that the entity specifies to be shared with the strangers.

5. The method recited in claim 2, wherein the geographic location comprises a latitude coordinate and longitude coordinate, and wherein the entity comprises one of a user and a software application.

6. The method recited in claim 1, wherein determining the geographic region comprises using a persistent hash map that maps geographic location to the geographic region.

7. The method recited in claim 1, comprising subdividing a surface area of the earth into a plurality of geographic regions comprising the geographic region, using a gridding method, wherein the plurality of geographic regions are equal in area.

8. The method recited in claim 6, wherein the geographic regions correspond to at least one of zip codes, and geopolitical borders.

9. The method recited in claim 1, comprising:
   receiving, for a plurality of entities, a corresponding plurality of geographic locations, and a corresponding plurality of nicknames; and
   visualizing a map comprising the plurality of nicknames at the corresponding plurality of geographic locations.

10. A system for publishing location information, comprising:
    a processing unit;
    and a system memory, wherein the system memory comprises code configured to direct the processing unit to:
       send a subscription request to a cloud service that maintains a subscription for an entity to a geographic region;
       send a request to the cloud service for the location information, the request based in part on metadata provided by a plurality of entities, the plurality of entities comprising associates and strangers of the entity associated with the geographic region;
       and receive the location information, wherein the location information comprises a plurality of geographic locations for the corresponding plurality of entities that are disposed within the geographic region, the location information from one or more of the plurality of entities to be prevented from being received when one or more of the plurality of entities is within a specified distance of a home of the one or more entities.

11. The system recited in claim 10, wherein the processing unit is to generate a map comprising a plurality of nicknames corresponding to the plurality of entities, wherein the plurality of nicknames are each located at a position on the map representing the corresponding plurality of geographic locations.

12. The system recited in claim 10, comprising code configured to direct the processing unit to:
    receive a subset of the location information from an entity that is a stranger; and
    determine that the stranger is disposed within the geographic region based on the subset of location information.

13. The system recited in claim 10, wherein the location information comprises information that the plurality of entities specify be shared with strangers.

14. The system recited in claim 10, wherein the geographic location comprises a latitude coordinate and longitude coordinate.

15. The system recited in claim 11, wherein the map comprises private information about the associate at a position on the map representing a geographic location of the associate.

16. The system recited in claim 10, wherein the geographic region is based on population data.

\* \* \* \* \*